June 23, 1953 J. A. CRANFORD 2,642,666
SPOOL DIMENSION INDICATOR
Filed Jan. 25, 1950 4 Sheets-Sheet 1

INVENTOR
J.A.CRANFORD
BY
W.C.Parnell
ATTORNEY

June 23, 1953     J. A. CRANFORD     2,642,666
SPOOL DIMENSION INDICATOR
Filed Jan. 25, 1950     4 Sheets-Sheet 2

INVENTOR
J.A.CRANFORD
BY
ATTORNEY

June 23, 1953  J. A. CRANFORD  2,642,666
SPOOL DIMENSION INDICATOR
Filed Jan. 25, 1950  4 Sheets-Sheet 3

INVENTOR
J. A. CRANFORD
BY
ATTORNEY

June 23, 1953 J. A. CRANFORD 2,642,666
SPOOL DIMENSION INDICATOR
Filed Jan. 25, 1950 4 Sheets-Sheet 4

INVENTOR
J. A. CRANFORD
BY *W.C.Parnell*
ATTORNEY

Patented June 23, 1953

2,642,666

UNITED STATES PATENT OFFICE 2,642,666

SPOOL DIMENSION INDICATOR

Jesse A. Cranford, Buffalo, N. Y., assignor to Western Electric Company, Incorporated, New York, N. Y., a corporation of New York Application January 25, 1950, Serial No. 140,365

7 Claims. (Cl. 33—148)

This invention relates to a testing apparatus and more particularly to a device for checking dimensions of winding spools.

In organizations which use flanged spools in large quantities in the manufacture of electrical coils and similar apparatus, the same spools are used many times and are collected and stored after one such use until needed in the future. Because of the relatively fragile nature of many types of spools, the rough handling which they often receive causes an appreciable number to become unfit for further use because of bent flanges and other damage. Since the winding of wire on spools with bent flanges causes uneven layer distribution and sloughing of the turns, it is desirable to test the spools before re-use to insure that certain dimensions are still correct, and it is an object of this invention to provide a spool dimension indicator for this purpose which is both accurate and fast in operation.

In the preferred embodiment of the invention, applicant accomplishes his purpose by placing a spool to be tested on a driven arbor. The testing mechanism contains two pivoted wobble measuring fingers which engage the inner surfaces of the flanges, with each finger being connected to a member having an index positioned according to the spacing between the flanges. Means is provided for shifting the indicator assembly radially along the flanges of the rotating spool.

Other objects and inventions will be apparent from the following detailed description when taken in consideration with the attached drawings in which.

Figure 1:
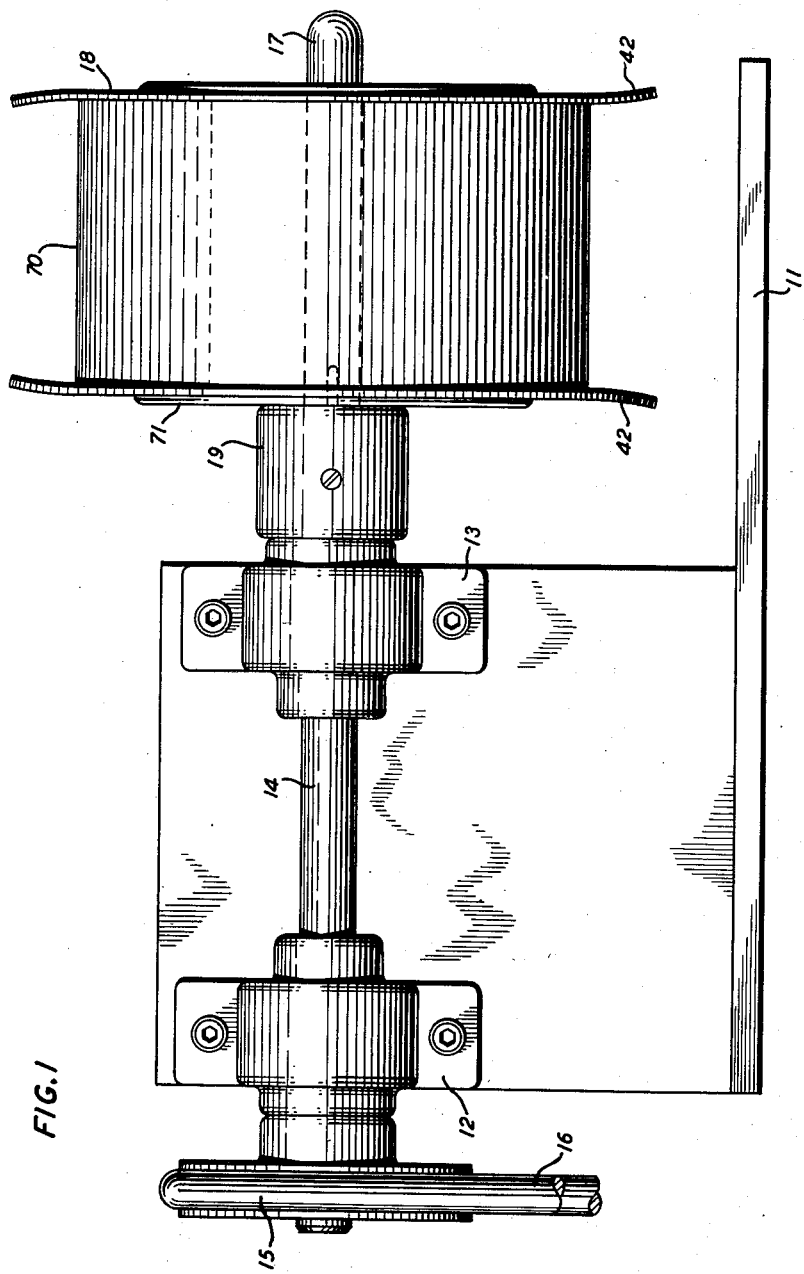
Fig. 1 is a front elevational view of the mounting arbor together with its driving means.

With reference to Fig. 1, showing the arbor positioning apparatus, a base 11 supports two aligned brackets 12 and 13, the brackets having bearings within which is positioned an arbor 14. The arbor is driven through a pulley 15 and belting 16 by suitable driving means (not shown). An extension 17 of the arbor is used for mounting a spool 18 to be tested, the spool being moved after mounting on the arbor against a positioning shoulder 19. The diameter of the arbor extension 17 is chosen to be the minimum permissible diameter of the winding spools so that in case the spool will not fit on the arbor, it is immediately rejected as unsuitable.

Figure 2:
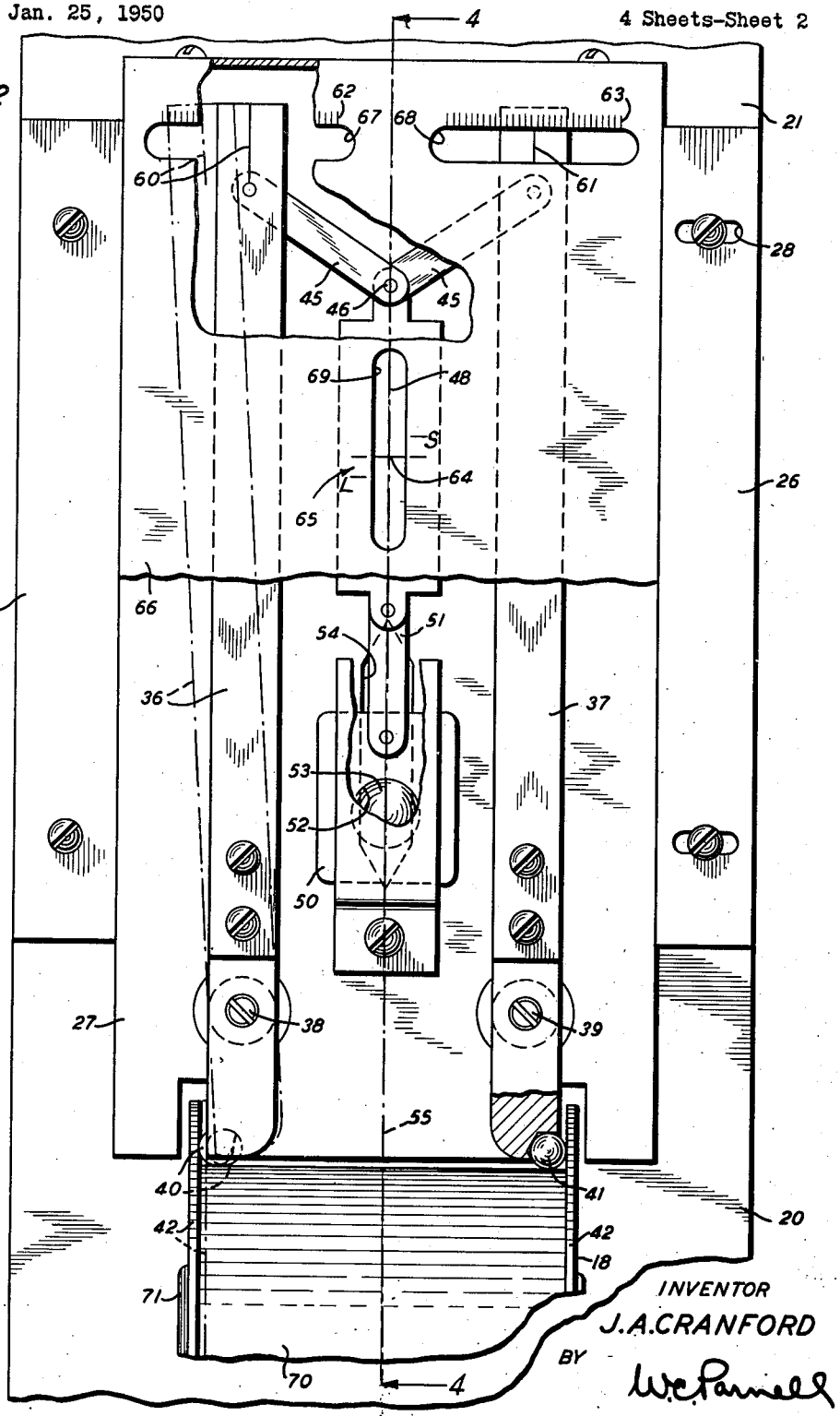
Fig. 2 is a view of the indicating mechanism.
Figure 3:
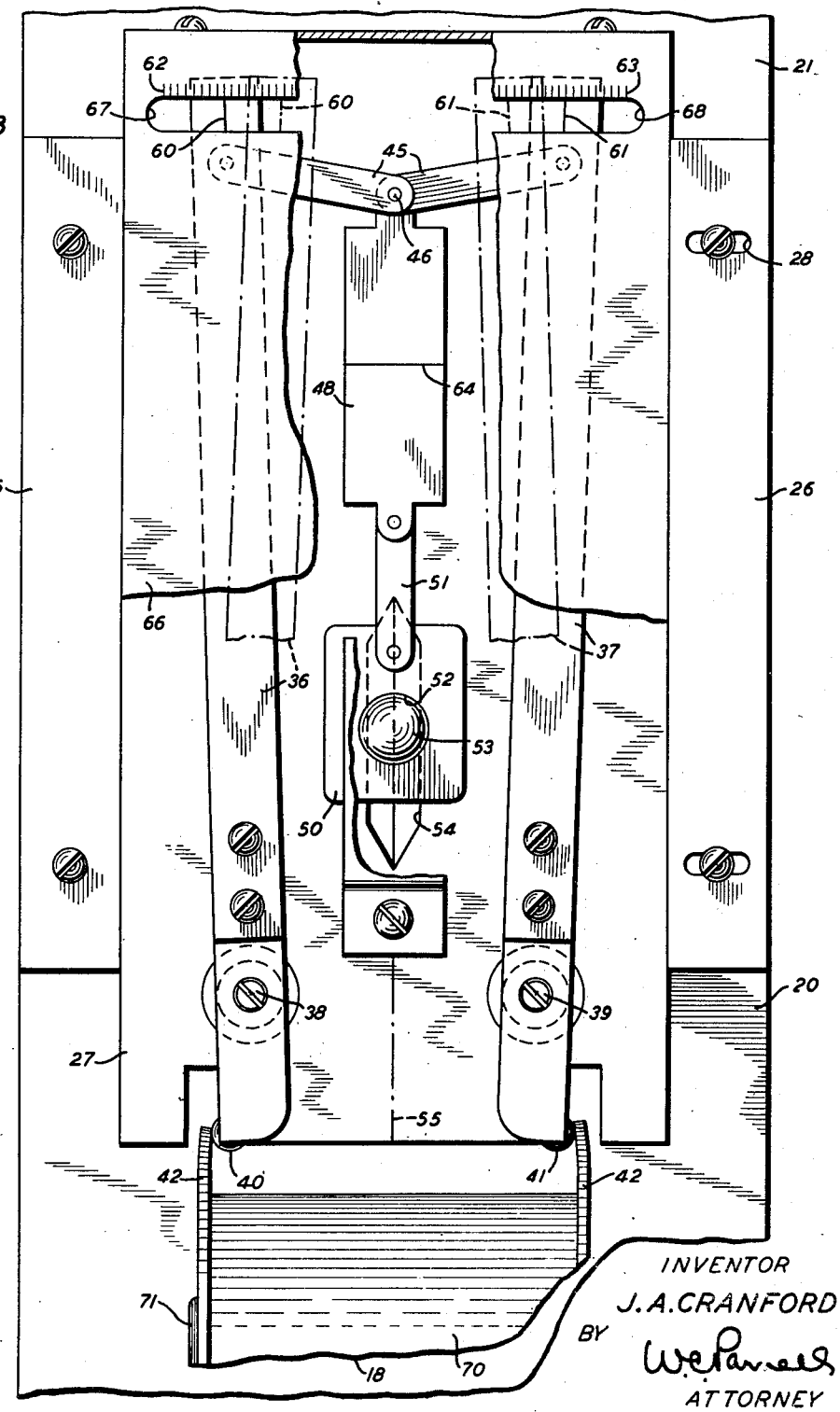
Fig. 3 is another view of the indicating mechanism showing measurements being made at the outer edges of the spool flanges.
Figure 4:
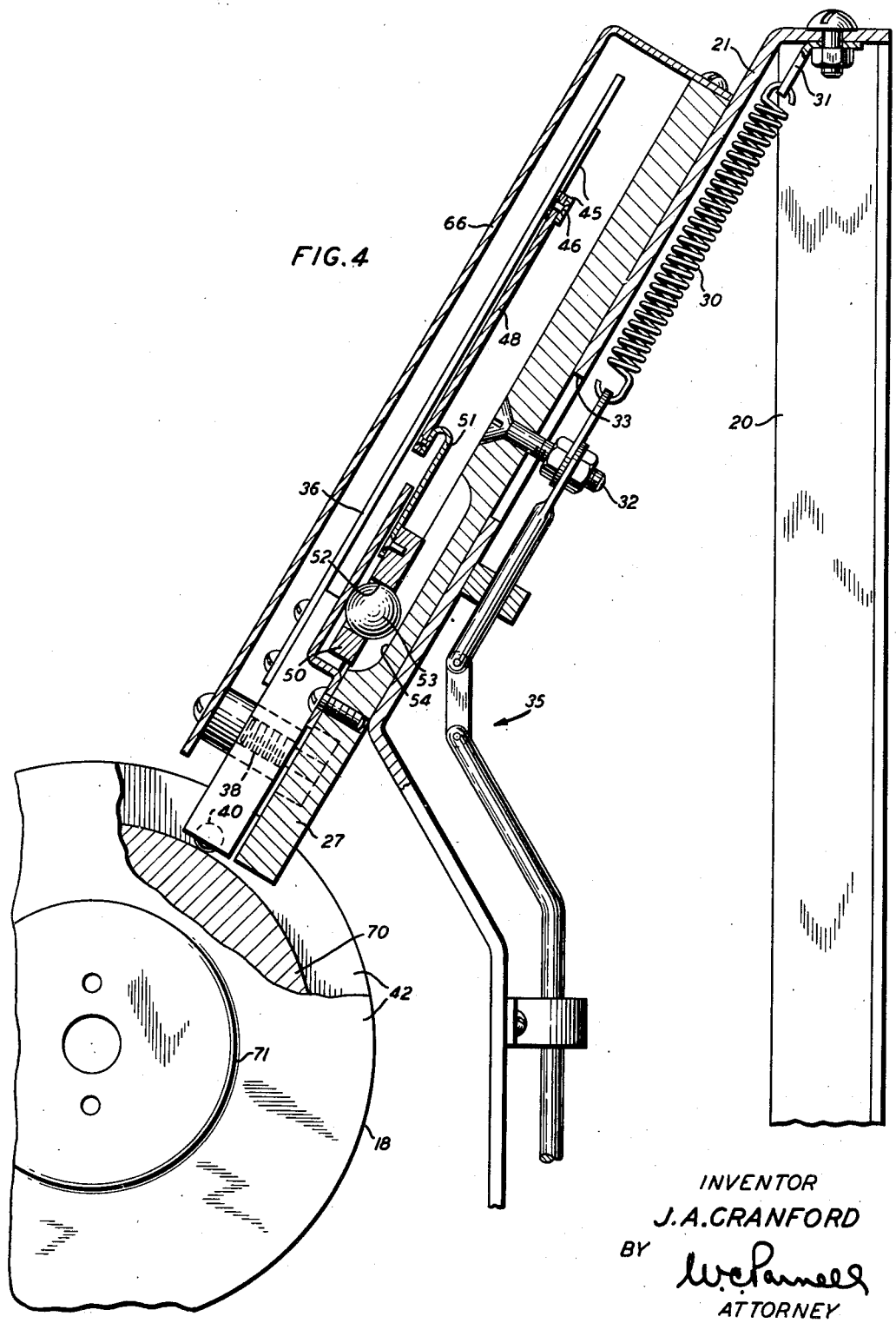
Fig. 4 is a side elevational view of the testing mechanism taken partially in section along the line 4—4 of Fig. 2.

The indicating mechanism is shown on Figs. 2, 3 and 4 and comprises a frame 20 which is mounted on the same base 11 which supports the positioning arbor. The frame 20 has an inclined surface 21 having side rails 25 and 26 mounted adjacent its side edges. A plate 27 is slidably mounted between the side rails 25 and 26 for movement relative to the inclined surface 21. One of the side rails as shown is provided with transverse slots 28 to allow lateral adjustment of the rail.

The plate 27 is supported on the inclined surface by a spring 30, anchored at one end by a lug 31 and connected at the other end to a bolt 32 which is rigidly fastened to the plate 27 and which is movable along a longitudinal slot 33 located in the inclined surface 21. The plate 27 is moved downwardly against the force of the spring 30 by means of a foot pedal (not shown) acting through a linkage generally designated as 35 which is fastened to the bolt 32. When pressure on the foot pedal is released, the force of the spring 30 causes the plate 27 to move to its uppermost position.

With reference to Figs. 2 and 3, two measuring fingers 36 and 37 are shown as pivotally connected to the plate 27 through pivot points 38 and 39. The fingers are fitted at their lower ends with freely rotatable balls 40 and 41 which make rolling contact with the inner surfaces of flanges 42 of the spool under test.

Two links 45 are rotatably mounted at the top ends of measuring fingers 36 and 37, with the links in turn being connected together at the joint 46. Also connected to the joint 46 so as to be suspended and supported therefrom is an indicating member 48. A weight 50 is supported from the lower end of the indicating member 48 through a linking member 51 which is pivotally connected to the member 48. Member 48 is free to oscillate about this pivot whenever the positioning of the fingers 36 and 37 moves the joint 46 away from the center line 55. The weighted member 50 is apertured at 52 to fit over a ball 53 in a groove 54 of the plate 27 so that the weighted member may move only along the center line 55 of the indicating mechanism.

The upper ends of measuring fingers 36 and 37 are provided with index lines 60 and 61, which indicate the positions of the two fingers on respective scales 62 and 63. The indicating member 48 is likewise provided with an index line 64, the scale 65 associated with this line including an upper line marked S for "short" and a lower line marked L for "long." The cover plate 66 for the overall indicating mechanism is provided with apertures 67 and 68 through which the operator may observe the readings of scales 62 and 63 and an aperture 69 through which the reading of scale 65 may be observed.

With reference to the operation of the indicating device, a spool whose dimensions are to be checked is placed in position on the arbor 14, with the arbor being rotated by suitable means. Since the arbor is given a diameter which is the minimum permissible diameter of the spool bore, a spool which will not fit upon the arbor is rejected immediately as being defective. The foot pedal associated with the indicating mechanism is next pressed downwardly, which moves the plate 27 and the fingers 36 and 37 in the same direction until the balls 40 and 41 make contact against both the drum 70 and the flanges 42 of the spool. The weighted member 50 will tend to pull the joint 46 downwardly and thus move the upper ends of the fingers 36 and 37 toward each other about their respective pivot points 38 and 39. This causes the lower ends of the fingers with their fitted balls to be urged against the inside surfaces of the flanges 42.

If there should be a wobble in either of the flanges, the deviation from standard will cause the ball and the lower end of the finger associated with the particular flange to move laterally during the rotation of the spool, the exact movement of the lower end being dependent on the nature of the bend or wobble in the flange. This lateral movement of the lower ends of the fingers is indicated on the scales 62 and 63 by their respective index markers 60 and 61. Limit lines representing maximum and minimum measurements or tolerances may be marked on the scales to enable the operator to determine at a glance if the spool is to be rejected. The scale 62 may also be used to measure the distance between the hub 71 of the spool and the inside surface of the left flange to determine if this measurement is within acceptable limits. If desired, a separate scale may be provided for this latter measurement to allow for the convenient use of a separate set of maximum and minimum tolerance markers, with the index line 60 being used for both scales.

Any movement of the upper ends of the measuring fingers 36 and 37 will cause the link members 45 to raise or lower the joint 46 in a generally vertical direction. Movement of the joint 46 in turn causes the indicating member 48 with its index line 64 to move up and down with respect to the scale 65. As will be seen from Figs. 2 and 3, this part of the mechanism thus measures the distance between the inside surfaces of the spool flanges, and the operator can tell at a glance by reference to the tolerance limit lines S and L if this distance is too short or too long.

After making the above measurements when the balls 40 and 41 are in contact with the drum 70 of the spool, the foot pedal is gradually released to permit the spring 30 to move the plate 27 upwardly and thereby move the balls radially outwardly along the inside surfaces of the spool flanges to enable the spool dimensions to be checked at various radial positions. An example of a measurement being taken at another radial position along the spool flanges is shown in Fig. 3.

By means of the indicating device herein described it is possible for an accurate check of spool dimensions to be made in an extremely short time, thus enabling the operator to determine which spools are suitable for further use, and which ones are unsuitable by virtue of a defect or a combination of defects discovered in the test.

While the proposed apparatus is primarily designed for use with spools used for winding purposes, it is not limited to this specific use but is of general application and may be adapted for use in any instance where it is desirable to make a rapid check of the dimensions of a rotating article. It is therefore to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an indicator for measuring simultaneously a plurality of dimensions of spool flanges, the combination with an arbor for supporting a spool to be measured and means for rotating the arbor, of two pivoted measuring fingers associated with the arbor, each of which is adapted at one end to engage the inner flange surfaces of a spool on the arbor, means for holding said one ends against the flanges, to cause the fingers to oscillate about their pivots in accordance with any wobble in the flanges, a scale adjacent and associated with the other end of each finger for indicating the wobble in each flange, means mounted between and connected to the said other ends of the fingers to move according to variations in the spacing between the flanges and a third scale cooperating therewith for indicating the flange spacing.

2. In an indicator for measuring simultaneously a plurality of dimensions of spool flanges, the combination with a base, an arbor mounted on the base for supporting a spool to be measured and means for rotating the arbor, of a support element having a flat surface also mounted on the base, a plate slidably mounted on the surface, two measuring fingers pivotally mounted on the plate, with the plate being positioned to align the fingers radially with the spool, and with each finger being adapted at one end to engage the inner flange surfaces of a spool on the arbor, means for holding said one ends against the flanges to cause the fingers to oscillate about their pivots in accordance with any wobble in the flanges, a scale adjacent and associated with the other end of each finger for indicating the wobble in each flange, means mounted between and connected to the said other ends of the fingers to move according to variations in the spacing between the flanges and a third scale cooperating therewith for indicating the flange spacing and means for sliding the plate on the flat surface to move the fingers radially along the flanges of the spool and thereby provide a scanning action in conjunction with the rotation of the arbor.

3. In an indicator for measuring simultaneously a plurality of dimensions of spool flanges, the combination with an arbor for supporting a spool to be measured and means for rotating the arbor, of two pivoted measuring fingers associated with the arbor adapted at one end to engage the inner flange surfaces of a spool on the arbor, scales adjacent the other ends and associated therewith for indicating the wobble of the flanges and a flange spacing indicator comprising an index member mounted between the fingers, links connecting the member to the fingers for automatically positioning the member according to the spacing between the fingers, and a scale associated with the member.

4. In an indicator for measuring simultaneously a plurality of dimensions of spool flanges, the combination with a base, an arbor mounted on the base for supporting a spool to be measured and means for rotating the arbor, of a support element having a flat surface also mounted on the base, a plate slidably mounted on the surface, two measuring fingers pivotally mounted on the plate, with the plate being positioned to align the fingers radially with the spool, and with each finger being adapted at one end to engage the inner flange surfaces of a spool on the arbor, scales adjacent the other ends for indicating the positions of the flanges, a flange spacing indicator comprising an index member mounted between the fingers, links connecting the member to the fingers for automatically positioning the member according to the spacing between the fingers, a scale associated with the member, and means for sliding the plate on the flat surface to move the fingers radially along the flanges of the spool and thereby provide a scanning action in conjunction with the rotation of the arbor.

5. In an indicator for measuring simultaneously a plurality of dimensions of spool flanges, the combination with a base, an arbor mounted on the base for supporting a spool to be measured and means for rotating the arbor, of a support element having a flat surface also mounted on the base, a plate slidably mounted on the surface, two measuring fingers pivotally mounted on the plate, with the plate being positioned to align the fingers radially with the spool, and with each finger being adapted at one end to engage the inner flange surfaces of a spool on the arbor, scales adjacent the other ends for indicating the positions of the flanges, a flange spacing indicator comprising an index member mounted between the fingers, links connecting the member to the fingers for automatically positioning the member according to the spacing between the fingers, a scale associated with the member, a weight suspended from the member for holding the said one ends against the flanges, and means for sliding the plate on the flat surface to move the fingers radially along the flanges of the spool.

6. In an indicator for measuring simultaneously a plurality of dimensions of spool flanges, the combination with a base, an arbor mounted on the base for supporting a spool to be measured, said arbor having a diameter equal to the minimum allowable bore of the spool, and means for rotating the arbor, of a support element having a flat surface also mounted on the base, a plate slidably mounted on the surface, two measuring fingers pivotally mounted on the plate, with the plate being positioned to align the fingers radially with the spool, and with each finger being adapted at one end to engage the inner flange surfaces of a spool on the arbor, scales adjacent the other ends for indicating the positions of the flanges, a flange spacing indicator comprising an index member mounted between the fingers, links connecting the member to the fingers for automatically positioning the member according to the spacing between the fingers, a scale associated with the member, and means for sliding the plate on the flat surface to move the fingers radially along the flanges of the spool, said means including a spring normally urging the plate in one direction and treadle means for moving the plate in the opposite direction against the force of the spring.

7. In an indicator for measuring simultaneously a plurality of dimensions of spool flanges, the combination with a base, an arbor mounted on the base for supporting a spool to be measured, said arbor having a diameter equal to the minimum allowable bore of the spool, and means for rotating the arbor, of a support element having a flat surface also mounted on the base, a plate slidably mounted on the surface, two measuring fingers pivotally mounted on the plate, with the plate being positioned to align the fingers radially with the spool, and with each finger being fitted at one end with a freely movable ball to engage the inner flange surfaces of a spool on the arbor, scales adjacent the other ends for indicating the positions of the flanges, a flange spacing indicator comprising an index member mounted between the fingers, links connecting the member to the fingers for automatically positioning the member according to the spacing between the fingers, a scale associated with the member, a weight suspended from the member for holding the said one ends against the flanges, and means for sliding the plate on the flat surface to move the fingers radially along the flanges of the spool, said means including a spring normally urging the plate in one direction and treadle means for moving the plate in the opposite direction against the force of the spring.

JESSE A. CRANFORD.

References Cited in the file of this patent

UNITED STATES PATENTS

| Number | Name | Date |
| --- | --- | --- |
| 762,786 | West | June 14, 1904 |
| 768,333 | LeBlanc | Aug. 23, 1904 |
| 1,461,083 | Damerell | July 10, 1923 |
| 1,599,609 | Damerell | Sept. 14, 1926 |
| 1,611,441 | Higgins | Dec. 21, 1926 |
| 1,938,216 | Damerell | Dec. 5, 1933 |
| 2,372,879 | Bjorklund et al. | Apr. 3, 1945 |
| 2,408,689 | Seme | Oct. 1, 1946 |
| 2,551,471 | Snow | May 1, 1951 |